United States Patent [19]

Lucchi et al.

[11] 4,249,174
[45] Feb. 3, 1981

[54] AIRCRAFT WEATHER RADAR SYSTEM
[75] Inventors: George A. Lucchi; Ramon H. Aires, both of Granada Hills, Calif.
[73] Assignee: RCA Corporation, New York, N.Y.
[21] Appl. No.: 44,088
[22] Filed: May 31, 1979
[51] Int. Cl.³ .......................... G01S 13/95; H01Q 1/28
[52] U.S. Cl. ................................... 343/5 W; 343/705; 343/17.1 PW
[58] Field of Search ............ 343/5 BB, 17.1 PW, 5 W, 343/705

[56] References Cited

U.S. PATENT DOCUMENTS

| | | | |
|---|---|---|---|
| 2,607,009 | 8/1952 | Affel, Jr. | 343/705 X |
| 3,009,152 | 11/1961 | Gregory et al. | 343/705 |
| 3,108,269 | 10/1963 | Collis | 343/5 W |
| 3,781,715 | 12/1973 | Poppe, Jr. et al. | 343/5 W X |
| 3,825,928 | 7/1974 | Williams | 343/854 X |
| 4,092,644 | 5/1978 | Hodge | 343/5 W |
| 4,106,021 | 8/1978 | Katagi | 343/5 W X |

OTHER PUBLICATIONS

"Solid State Airborne Weather Radar Fully Satisfying ARINC and TSO Specifications" by Atsushi Kurokawa et al., Komukai Works, Tokyo Shibawra Electric Co., Ltd., Toshiba Review, Jun. 1971, 515030062, pp. 19-23.

Primary Examiner—Malcolm F. Hubler
Attorney, Agent, or Firm—Samuel Cohen; Joseph D. Lazar; Raymond E. Smiley

[57] ABSTRACT

A low cost airborne weather radar system suitable for mounting in the wing of a single engine aircraft. The radar antenna is a truncated parabolic dish. The receiver/transmitter, relative to parameters used in a conventional receiver/transmitter operates at relatively small peak transmitter power with a relatively long transmitter pulsewidth which, in turn, is matched to the receiver bandwidth. The relatively small peak power allows for acceptable range performance due to the relatively larger pulse width. Further, the receiver/transmitter assembly is significantly reduced in size so as to facilitate location in an aircraft wing and be thereby directly connected to the antenna to eliminate range reducing intercabling losses.

6 Claims, 3 Drawing Figures

AIRCRAFT WEATHER RADAR SYSTEM

An airborne weather radar system comprises three main parts: an antenna section, a receiver/transmitter and an indicator. The antenna section comprises a dish or flat plate serving as the actual radio frequency transmitting and receiving antenna and a mechanical mechanism for pivoting the antenna from side-to-side and for pivoting the antenna up and down. The antenna is typically mounted in the nose of an aircraft behind a radome. The side-to-side scan is for the purpose of "seeing" weather to some number of degrees, typically 60°-90°, on either side of the aircraft. The up and down movement is for the purpose of maintaining the antenna in a horizontal direction relative to the earth regardless of the pitch of the aircraft to avoid ground clutter or for purposely pointing the antenna toward the ground for "mapping" the ground. The receiver/transmitter part is typically mounted in an "electronics" rack of the aircraft remote from both the antenna and aircraft cockpit. The indicator part is typically mounted on the aircraft cockpit instrument panel and includes a displaced screen and various switches to control range, screen intensity, mode (weather or ground mapping), etc. Cabling connects the antenna to the receiver/transmitter and receiver/transmitter to the indicator. Signal loss in the cable between the receiver/transmitter and antenna is significant.

There has been a long standing need for single engine aircraft weather radar systems at a price commensurate with the price of a single engine aircraft yet with acceptable resolution at ranges useful to single engine pilots. Historically, such radar systems have not been available for two fundamental reasons and several secondary reasons. The two fundamental reasons are (1) the relatively large size of the antenna which prohibits it from being installed in a wing on the aircraft, and (2) the relatively large amount of radio frequency power required in the receiver/transmitter power which in turn requires a receiver/transmitter that (1) uses a large amount of aircraft power, (2) is bulky (3) is heavy, and (4) is costly, all such factors being inconsistent with single engine usage. Although in multi-engine planes the radar antenna is located in the nose of the aircraft, the nose location of the engine in the single engine aircraft, prohibits placement of the antenna thereat. Various alternate locations of antenna have been suggested, viz., (1) in the wing tip, (2) in a radome under the fuselage of the aircraft and (3) mounted in front of the engine compartment but behind the propeller. The latter mounting requires sychronization of the propeller and the radar. All other methods are not only esthetically unpleasing but also create aerodynamic problems.

The ideal solution is to mount both the receiver/transmitter and antenna in one of the aircraft wings to reduce receiver/transmitter-antenna intercabling costs and also reduce intercabling signal losses which directly affect useful range. Such an arrangement has been heretofor considered impossible because the wing cross section dictates a reduced size of antenna from that normally used in multi-engine aircraft. A reduced size antenna reduces radar range. Furthermore the usually large bulk and weight of the receiver/transmitter prohibits its being mounted in the wing, a desirable location to decrease cabling losses.

Reducing the power of the transmitter would enable its size to be reduced but this has not been a conventionally acceptable solution because of the effect of power on range. An airline industry accepted range equation is given below for determining the useful range R of a radar as a function of the performance index (PI) defined by various parameters which affect the range:

$$R = \text{antilog}_{10} \frac{PI - 20}{40} \text{ Nautical Miles} \quad (1)$$

and:

$$PI(dB) = 10 \log_{10} P_t + 20 \log_{10} G + 20 \log_{10} T + I(dB) - NF(dB) - B_f(dB) + K(dB) \quad (2)$$

which assumes a 7 dB loss of the radome and the cabling between the antenna and receiver/transmitter where $P_t$ = Peak transmitter power in watts G = Radar antenna one way gain, a ratio over isotropic radiator T = The radar transmitter pulse width in microseconds $$I = \text{Display integration Factor, in } dB \quad (3)$$
$$= 3 \times \log_{10}\left(\frac{\text{Ant. Horizontal Beam Width}}{\text{Ant. Horizontal Scan Angle}}\right) \times PRF$$

in which:

The antenna horizontal beam width is measured in degrees between the 3 dB points.

The antenna horizontal scan angle is measured in degrees with respect to the main lobe.

PRF is the pulse repetition frequency in cycles per second.

NF = The radar system noise figure in dB. (The noise figure is measured at the transmitter/receiver antenna terminal.)

$B_f$ = The receiver bandwidth function defined as follows:

Where the receiver bandwidth $B \leq (1.5/T)$, $B_f = 0$ (4)

Where the receiver bandwidth $B > (1.5/T)$, $B_f = 5 \log_{10} (BT/1.5)$ (5)

B being the receiver bandwidth in MHz;

T being the transmitter pulse width in microseconds; and the product BT does not exceed four K is a fixed constant as follows:

| Transmitter Frequency | Weather Penetration | Weather Avoidance |
|---|---|---|
| C-Band (5400 MHz) | 0 dB | +3 dB |
| X-Band (9345 MHz) | −6 dB | +6 dB |

It will be noted from equation (2) that range is a function of the transmitter power, Pt, and of the amount of antenna gain, G, both of which must be reduced for an antenna and receiver/transmitter located within a wing. The equations assume a particular rainfall rate.

Further it is assumed as indicated above, that there is a loss of 7 dB caused by the radar installation losses between the transmitter/receiver antenna connector and the outside of the antenna radome. The assumed losses are essentially caused by the radome and the cabling between the antenna and the transmitter/receiver. For losses of less or more than this assumed value of 7 dB, the performance index (PI) defined by equation (2) above, is to be modified accordingly. Thus, for a airline transport type aircraft, the cabling losses are about 5.6 dB and the radome loss is about 1.4 dB, resulting in an overall 7 dB radar installation loss. For such an aircraft no modification of the PI equation (2) is required. For a general aviation type aircraft, the cabling losses are about 2.6 dB with a 1.4 dB loss due to the radome resulting in an overall loss of 4 dB. For such an aircraft, equation (2) is modified to provide 3 dB of gain which gain is useful in extending the range accordingly in equation (1) by enhancing the calculated value of PI.

In accordance with the present invention, since there are no cabling losses the only loss due to the radar installation is 1.4 dB caused only by the radome. Thus, equation (2) is modified by the addition of a 5.6 dB gain which gain is useful in extending the range equation (1), accordingly.

In accordance with the present invention a low cost weather radar system adjustable to display any selected one of at least two ranges comprises a pivotable antenna, an RF transmitter means connected thereto and producing RF pulses not exceeding 2000 watts having a pulse width when displaying the greatest selected range not less than 8 microseconds. The weather radar system also includes an RF receiver coupled to the antenna and receptive of reflected RF pulses, the receiver having a bandwidth such that the product of the bandwidth in MHz and the pulse width in microseconds does not exceed 1.5.

Figure 1:
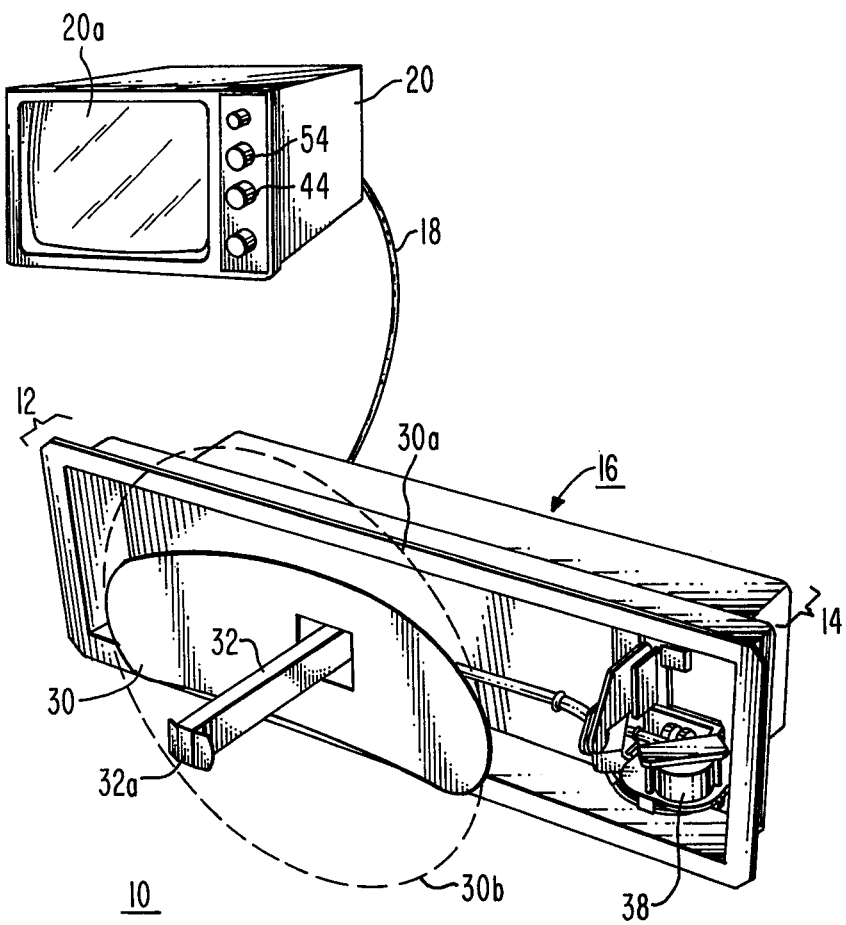
FIG. 1 is an airborne weather radar system showing the components in perspective.

Referring to FIG. 1, there is shown an airborne weather radar system 10 comprising two assemblies, an antenna section 12 combined with a receiver/transmitter (R/T) 14 in one unitary housing 16 and a digital indicator 20 interconnected by a suitable cable 18.

Figure 2:
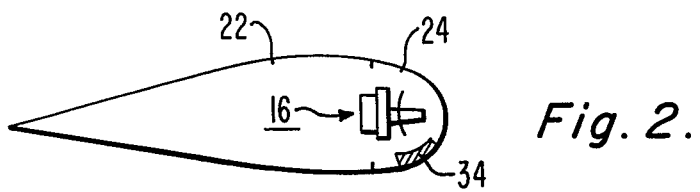
FIG. 2 is a portion of an aircraft wing in cross section showing a combined receiver/transmitter and antenna situated therein in accordance with the invention.

As illustrated in FIG. 2 which is a vertical cross section of a wing, the antenna and R/T assembly 16 is mounted in the leading edge (front) of a wing 22 behind a radome 24. Radome 24 replaces the original wing material and forms the leading edge of the wing. In some aircraft due to the placement of the structural members of the wing the receiver/transmitter 14 and antenna section 12 may have to be slightly displaced from one another. In this case a short cable may be used which exhibits far less loss than the assumed cabling loss (equations (1) and (2)) of 5.6 dB.

Returning to FIG. 1, indicator 20 may be of the type described in detail in U.S. Pat. No. 4,106,021 issued Aug. 8, 1978 K. Katagi and assigned to the common assignee the specification of which patent is incorporated by reference in this specification. Accordingly, no further detailed description will be given herein except as required to explain the operation of RT 14.

Antenna section 12 comprises an antenna parabolic dish 30 which is part of a conventional circular parabolic dish which is modified by the dashed portions 30a and 30b being removed to facilitate installation in a wing. A hollow elongated feed 32 positioned, when in an aircraft, generally parallel to the airplane fuselage (not shown) receives microwave energy from R/T 14, as will be hereinafter described, which energy is directed through feed 32 to tip 32a of feed 32 and thence back toward dish 30 and then reflected into the atmosphere. The return signals from the atmosphere are reflected by antenna dish 30 to tip 32a and then along feed 32 to R/T 14. Due to the shape of the dish the antenna gain, G, equation (2), is reduced from the gain experienced with a conventional round antenna. Further, the vertical beam width is greater with antenna 30 than with a conventional antenna. To prevent the beam from undesirably being beamed to and reflected from the ground while tracking weather, a conventional microwave absorbing material 34 is positioned inside radome 24 to absorb downwardly directed energy.

Returning to FIG. 1, conventional drive means not seen behind dish 30, pivots antenna dish 30 in a horizontal plane (azimuth) to scan from side to side. Similarly, conventional drive means 38 pivots antenna dish 30 in a vertical plane (elevation) to scan either the air or ground depending on whether weather or ground mapping is desired. Feed 32, it is noted, remains stationary relative to the airplane, only dish 30 moves.

Figure 3:
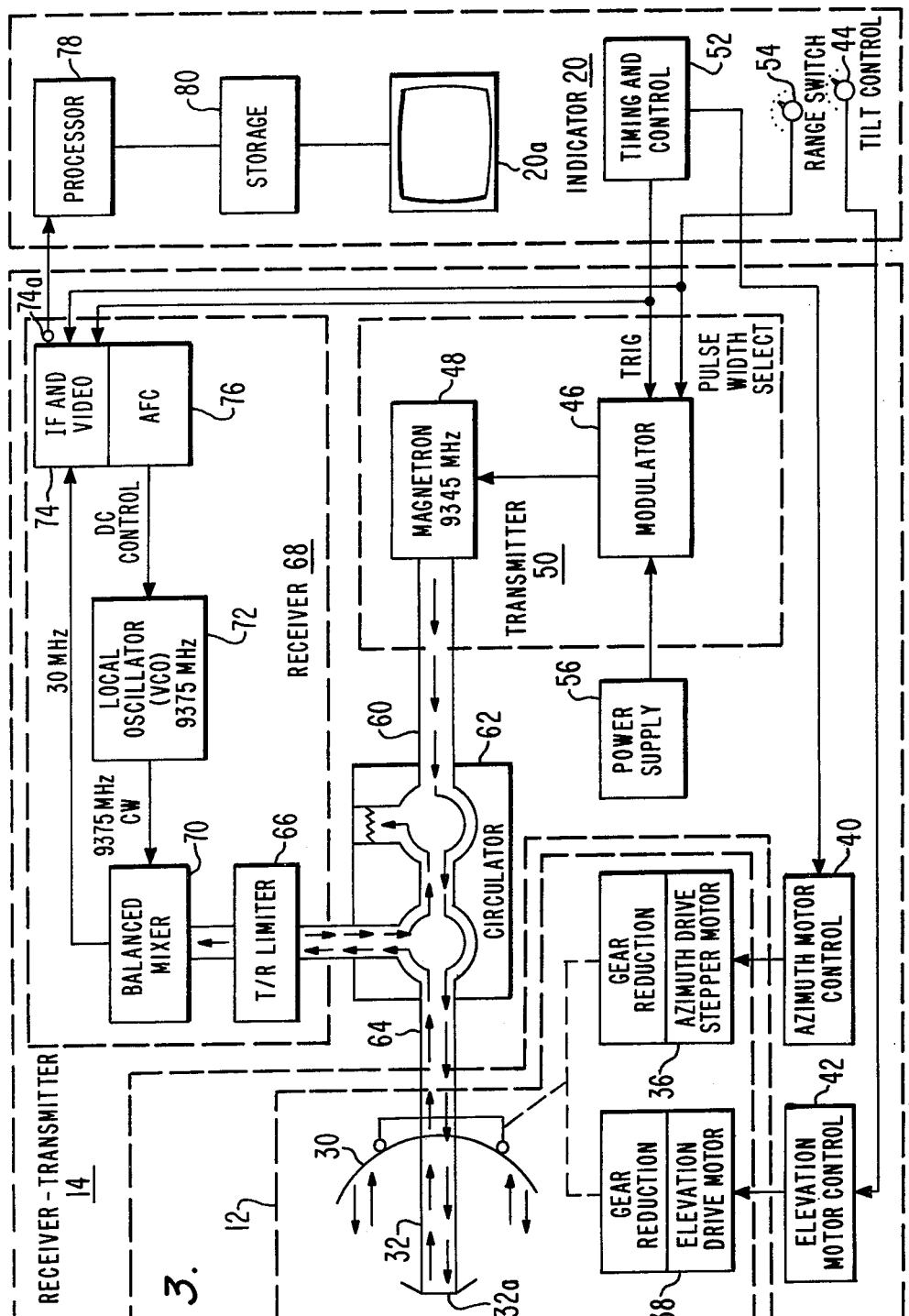
FIG. 3 is a block diagram of a weather radar receiver/transmitter in accordance with the present invention and parts of an indicator required to facilitate an understanding of the operation of the receiver/transmitter.

Referring to FIG. 3, conventional azimuth and elevation motor controls 40 and 42, respectively, drive motors 36 and 38 as required to position antenna dish 30. A manual tilt control 44 located on indicator 20 provides signals to motor control 42 to control the elevational angle of antenna 30. A modulator 46 and magnetron 48 comprise the transmitter portion 50 of R/T 14. Modulator 46 may be a solid-state modulator of the type described in co-pending U.S. Patent Application Ser. No. 044,217, filed May 31, 1979, by D. C. Clock, et al. As described in the co-pending application, modulator 46 receives pulses at the pulse repetition frequency of the radar system from a master timing and control circuit 52 located in radar indicator 20 and receives signals to control the pulse width duration of the modulated output signal from a range switch 54 also located in indicator 20. Modulator 46 also receives a high voltage DC potential from power supply 56 which is amplified in voltage by modulator 46 to provide high voltage bias pulses to power magnetron 48 at a pulse repetition frequency determined by timing and control 52 with a pulse width determined by range switch 54.

Magnetron 48 is a positive anode type in which the cathode is circuit grounded while the anode is adapted to receive input bias voltage pulses. Magnetron 48 is responsive to bias voltage pulses from modulator 46 to produce an RF signal, at for example 9345 MHz, which signal is coupled via waveguide 60 through a circulator 62 and waveguide 64 to feed 32 of antenna assembly 12. The signal thus appearing at feed tip 32a is reflected by dish 30 into the atmosphere to strike and be reflected by various atmospheric parameters and, in particular, by rain showers. Thus, for example, a greater rainfall per unit time will cause a greater portion of the signal to be reflected back to dish 30 while a rain shower of a smaller amount per unit time will cause a smaller percentage of the signal radiated by dish 30 to be reflected back thereto. Returning signals of whatever value are directed through waveguide 64 and circulator 62 to a transmit/receive (T/R) limiter 66 in receiver 68 portion of R/T 14. Limiter 66 prevents excessive power from damaging balanced mixer 70, to which the output of limiter 66 is connected, while transmitted pulses are being produced by magnetron 48. Balanced mixer 70 of conventional design receives, in addition to return radar signals, signals from a voltage controlled local oscillator (VCO) 72 at a nominal frequency which is separated a given amount from that produced by magnetron 48. For example, magnetron 48 may produce radio frequency signals of 9345 MHz while local oscillator 72 may produce a nominal frequency of 9375 MHz. For this example, balanced mixer 70 produces a 30 MHz intermediate frequency (IF) signal which is applied to an IF and video circuit 74. Circuit 74 passes the signals received thereby to an automatic frequency circuit (AFC) 76 of conventional design which produces a DC error voltage if any frequency other than 30 MHz is being received by the AFC 76. The error voltage is applied to oscillator 72 to maintain its output frequency such that balanced mixer 70 continues to produce a given IF frequency, such as 30 MHz, regardless of frequency drifts in magnetron 48.

Circuit 74, in addition to the signal received from balanced mixer 70, also receives control signals from range switch 54 and timing signals from timing and control circuit 52 which timing signals are at the same rate and time as those signals applied to modulator 46. Circuit 74 responds to the various signals it receives to produce at its output terminal 74a series of digital video signals representing the strength of signals reflected to and received at antenna 30, corrected for a decrease in signal strength as a function of distance of the signal reflected to antenna 30. By way of example, circuit 74 may produce a series of two bit signals (representing one of four values) representative of weather conditions at increasing distances from dish 30 directly in front of the dish at the particular angle at which it is directed relative to the longitudinal direction of the aircraft. As described in the aforementioned patent to Katagi, the range switch 54 setting determines the number of two bit signals produced by circuit 74 per unit time, the number being greater at lower range settings of switch 54 and lower at longer range settings of switch 54. The total number of such two bit signals is fixed, however, regardless of the setting of switch 54.

The series of two bit signals are processed in processor 78, stored in storage 80 and displayed on display screen 20a (FIG. 1) as described in the Katagi patent. At longer range settings each two bit signal represents a greater distance than at shorter range settings. Said another way, the display resolution is less at longer range settings of switch 54 and greater at shorter range settings thereof. For example, if circuit 74 produces 128 two bit signals and a range of 128 nautical miles is being displayed in accordance with the setting of range switch 54, each two bit signal represents one nautical mile; if a range of 32 nautical miles is being displayed, than each two bit signal represents one-fourth mile.

System resolution can also be a function of the duration of the pulse width of the signal produced by magnetron 48 under control of modulator 46. Up to some duration of the pulse width the distance represented by each two bit signal is the limiting resolution factor. For greater pulse widths the pulse width becomes the limiting factor of resolution. Therefore, at larger range settings of switch 54 the pulse width can be relatively long and still not limit display resolution while at shorter ranges the duration of the pulse width must be correspondingly reduced to prevent limiting the displayed resolution. Thus, for example, a ten microsecond pulse width when considering the round-trip time of the RF signal emitted at antenna 12 represents 0.81 nautical miles. Given therefore the above example of 128 two bit signals, a range setting above 104 miles will result in the display being the limiting resolution element while range settings below 104 miles will result in the pulse width being the limiting resolution element.

In prior art weather radar systems it has always been considered normal design practice to utilize a magnetron producing maximum peak transmitting power signals such as 10,000 watts consistent with cost, space and available drive power to achieve maximum possible range (See equation (2)). Such high power magnetrons are relatively bulky and heavy. Further, such magnetrons require a very high voltage pulse producing modulator which conventionally dictates a conventional line type modulator. Such line type modulators are also bulky and heavy.

It is also considered normal design practice to limit the pulse width or time duration of the signal produced by magnetron 48 for at least two reasons. One is to not limit display resolution as described above. The second is to prevent a deficiency at cathode electron emission due to cathode depletion. For the above reasons heretofore existing magnetrons have been designed to produce relatively great power, such as 10,000 watts or more, with a relatively narrow pulse width, on an order of 3 microseconds or less. Because of the high bias power input required for magnetron 48 to produce the high power output of pulses, the type of modulators heretofore available to produce the bias pulses had turn-on and turn-off parameters such that the output frequency of magnetron 48 was not necessarily at the ideal design frequency but rather had a frequency spectrum extending on either side of the design frequency. Thus, the signal produced by magnetron 48 covered a rather wide frequency spectrum. The wide frequency spectrum was transmitted by and returned to antenna dish 30 to be converted by mixer 70 to nominal 30 MHz signals which were in reality a spectrum of frequencies about 30 MHz. Thus, to receive maximum power the bandwidth in prior art IF and video circuits 74 had to be relatively wide. From equation (2) it will be noted that the bandwidth factor, $B_f$, is one of the factors determining range in that the lower the value of $B_f$ the greater the range. It will be further noted from equations (4) and (5) that $B_f$ is either zero or some positive value. Therefore, since $B_f$ is subtracted from the other factors in equation (2), zero is desired, and from equation (3a) it will be noted that $B_f$ is zero when $BT \leq 1.5$ where B is the bandwidth of circuit 74 and T is the pulse width of the signal produced by modulator 46 and magnetron 48. In equation (4) it is seen that as bandwidth of circuit 74 is increased to handle the expected frequency spectrum processed thereby the pulse width of modulator 46 must be decreased to comply with equation (3a). In prior art systems both for airlines and general aviation, $BT > 1.5$ was the norm resulting in reduced range. Thus in the prior art, design philosophy dictated high power transmitters with narrow pulse widths and a wide bandwidth receiver. Range reducing intercable losses between the antenna and R/T were accepted though obviously not desired.

In accordance with the present invention the inventors have discovered that, contrary to the prior art, utilization of a different set of parameters from those above described permit acceptable range levels in an R/T package sufficiently small in physical size to enable it to be placed in a wing. First, the required peak output power of magnetron 48 is reduced substantially to on the order of 1,000–1,500 watts. Second, the pulse width time duration of the signal produced by modulator 46 is increased to a time duration considerably above what was considered normal such as to 10 or 20 microseconds at a long range setting of switch 54 and to some lower time duration such as 4.5 microseconds at shorter range settings of switch 54 noting that the display (20) not the magnetron pulse width should be the limiting resolution element. Cathode depletion is not a problem in low power magnetrons. Such magnetrons are within the state of the art of magnetron manufacturers. Because the peak power output of magnetron 48 is reduced substantially, its power input is correspondingly reduced, and, therefore, the bias power output requirements of modulator 46 are reduced substantially. The lowered peak power requirements of modulator 46 permits a solid-state design using a switching transistor as the modulating element as described in the aforementioned U.S. Patent Application Ser. No. 044,217. Transistorized switching modulators are inherently more stable than prior art modulators such that the undesired wide spectrum of the radio frequency signal produced by magnetron 48 is no longer present. With a narrow frequency spectrum produced by magnetron 48 the bandwidth of circuit 74 may be reduced by known technology to achieve the product $BT \leq 1.5$ such that $B_f$ is zero. It is also known that the bandwidth must be matched to the pulse width such that BT ideally equals 1.2. Further, with a substantially reduced peak power output from magnetron 48, its heat dissipation requirements decrease and it can be placed in a much smaller physical case than prior art magnetrons. When the smaller power requirements of the magnetron are combined with large scale integrated (LSI) circuit technology a package results which may be fitted into the wing of an aircraft, in turn, eliminating the need for intercabling with its associated losses. Further, it is realized that a small airplane likely to use such a system as described travels at a sufficiently slow speed such that a very long range is not needed by the weather radar system.

Operation of the system of FIG. 3 is as follows. Assume antenna dish 30 to be at some preselected point such as 0° relative to the aircraft fuselage. Timing and control circuit 52 produces a pulse to pivot antenna 30 in azimuth under control of motor control 40 and antenna stepper motor 36. The antenna is thereby pivoted to a new location which typically is a fraction of a degree to the right or left of the preceeding location. Speed of response and movement of the antenna dish 30 is such that all the electronic events to be described will have occurred before antenna dish 30 begins to pivot to a new location. Timing and control 52 also provides a pulse to trigger modulator 46. Modulator 46 in response thereto produces a high voltage bias pulse which is applied to magnetron 48. As described in the aforementioned patent application Ser. No. 044,217, the time duration of the bias pulse depends on the setting of range switch 54. However, at long ranges a pulse width of 10 or 20 microseconds or even more depending on the resolution of the display 20a may be utilized. Magnetron 48 responds to the bias pulse by producing a radio frequency (RF) pulse equal to the duration of the bias pulse at a relatively low power, on the order of 1,000 watts peak power, in a frequency spectrum which is tightly controlled as to bandwidth. The RF signal pulse is passed via circulator 62 to antenna dish 30 where it is reflected therefrom and returned to the antenna then to balanced mixer 70 all in conventional manner. The return signal is mixed in mixer 70 with the signal produced by local oscillator 72 to produce a 30 MHz intermediate frequency signal which is passed to IF and video circuit 74. The bandwidth of circuit 74 is matched to the return IF signal such that the product of the circuit 74 bandwidth in MHz and modulator 48 pulse width in microseconds does not exceed 1.5. As previously mentioned, circuit 74 produces a series of two bit signals responsive to atmospheric conditions at increased distances from antenna 30, which two bit signals are processed, stored and displayed in indicator 20 as described in the aforementioned patent to Katagi et al. Following the steps just described, timing and control circuit 52 produces another pulse which again advances antenna dish 30 and triggers modulator 46 to produce an additional bias pulse to be utilized as previously described.

In one such system as described above the following parameters are utilized with the equivalent value in decibles shown from equation (2) shown in parentheses.

$P_t = 1,000$ watts (30 dB)

G for a $10.2$ cm $\times 30.5$ cm truncated parabolic antenna $= 158.5$ (22 dB)

$T = 10\mu$ seconds (10 dB)

$I = 3 \log_{10} \times (8 \times 228)/90$ (3.9 dB)

$NF = 8$ dB $B_f = 0$ dB $K = 6$ dB (X-band avoidance mode assumed)

Radome loss $= 1.4$ dB, in which case, $PI = 101.5$ dB from equation (2)

Range $= $ antilog$_{10}$ $(101.5 - 20)/40 = 109$ nautical miles from equation (1)

As a second example, assume all other parameters are as above described, but $T = 20$ microseconds, equivalent to a range resolution of 1.62 nautical miles, and a similar range setting of 100 nautical miles on range switch 54. Thus, the resolution due to the 20 microsecond pulse width is 1.62% of the total display which is less than the operators ability to resolve visually. However, substituting 20 microseconds for 10 microseconds in equation (2) results in a range of 154 nautical miles.

As described previously at shorter range settings a shorter pulse width may be produced by modulator 46 to maintain desired resolution on display screen 20a. The bandwidth of circuit 74 must be increased accordingly to maintain the product $BT \cong 1.2$.

It will be realized that the parameters as above described and the unit packaged antenna and R/T are not limited to in-the-wing mounting or for that matter single engine aircraft but may be utilized in radars installed in small or large multi-engine aircraft. Further, the magnetron may be replaced by any means responsive to a modulated signal for producing an RF signal. For example, the modulator may be replaced by a solid-state pulsed oscillator which produces high power only with great difficulty but which can easily be made to produce a relatively low power RF signal with great accuracy of frequency. Such a solid-state oscillator is described in U.S. Patent Ser. No. 044,177, filed May 31, 1979, by H. C. Johnson.

What is claimed is:

1. In an airborne weather radar system of the type comprising an antenna means, an indicator means, and receiver/transmitter (R/T) means, said R/T means comprising a modulator adapted to produce periodic bias pulses of a predetermined time duration, means responsive to each bias pulse for producing a radio frequency signal of a given peak power and of time duration corresponding to said predetermined time duration, said antenna means being responsive to said radio frequency signal for radiating said signal and for receiving return signals, said R/T also comprising local oscillator means for producing a local oscillator signal, means for subtractively mixing said return signals and said local oscillator signal for producing an intermediate frequency (IF) signal, and amplifying means responsive to said IF signal for producing a signal which, as a function of time, represents the strength of said return signals, said amplifying means having a bandwidth which is a predetermined function of said time duration, wherein the improvement comprises:

(a) said means producing said radio frequency signal producing said radio frequency signal having a peak power not in excess of 2000 watts; and (b) said modulator producing pulses of time duration not less than 8 microseconds; and (c) said amplifier means adapted to have a bandwidth not greater than 1.5 divided by said modulator pulse time duration, said bandwidth and said time duration being in hertz and seconds, respectively.

2. The combination as set forth in claim 1, wherein said antenna means comprises an antenna reflecting dish elongated in shape.

3. The combination as set forth in claim 1, wherein said R/T and antenna are in one unitary housing.

4. The combination as set forth in claim 2 or claim 3, wherein said R/T and antenna are adapted for mounting in a wing of an aircraft.

5. In an airborne weather radar system of the type comprising an antenna means, an indicator means, and receiver/transmitter (R/T) means, said R/T means comprising a modulator adapted to produce periodic bias pulses of a predetermined time duration, means responsive to each bias pulse for producing a radio frequency signal of a given peak power and of time duration corresponding to said predetermined time duration, said antenna means being responsive to said radio frequency signal for radiating said signal and for receiving return signals, said R/T means also comprising local oscillator means for producing a local oscillator signal, means for subtractively mixing said return signals and said local oscillator signal for producing an intermediate frequency (IF) signal, and amplifying means responsive to said IF signal for producing a signal which, as a function of time represents the strength of said return signals, said amplifying means having bandwidth which is a predetermined function of said time duration, wherein the improvement comprises:

an aircraft wing;

and wherein said antenna means includes an antenna reflecting dish of generally elongated parabolic shape having a vertical aperture substantially shorter than the horizontal aperture mounted within said wing;

and wherein said R/T is mounted in said wing is proximity to said antenna dish.

6. The combination as set forth in claims 1, or 2, or 3, or 5, wherein said antenna means comprises a parabolic reflecting antenna dish having an aperture and an elongated feed with reflecting tip extending through said aperture, said feed being coupled to said R/T to receive signals therefrom to be radiated and to pass said returned signals to said R/T, said antenna means including means for pivoting said antenna dish relative to said feed to provide scanning.

* * * * *